(12) United States Patent
Twigger et al.

(10) Patent No.: US 8,657,105 B2
(45) Date of Patent: Feb. 25, 2014

(54) SYSTEM AND METHOD FOR CONTROLLING A CONVEYOR BELT CONDITION MONITORING SYSTEM

(75) Inventors: Mick Twigger, Charlotte, NC (US); George Mark Myers, Charlotte, NC (US)

(73) Assignee: Fenner Dunlop Americas, Inc., Charlotte, NC (US)

(*) Notice: Subject to any disclaimer, the term of this patent is extended or adjusted under 35 U.S.C. 154(b) by 308 days.

(21) Appl. No.: 13/119,912

(22) PCT Filed: Sep. 16, 2009

(86) PCT No.: PCT/US2009/057066
§ 371 (c)(1),
(2), (4) Date: Sep. 8, 2011

(87) PCT Pub. No.: WO2010/033529
PCT Pub. Date: Mar. 25, 2010

(65) Prior Publication Data
US 2012/0125736 A1    May 24, 2012

Related U.S. Application Data

(60) Provisional application No. 61/098,461, filed on Sep. 19, 2008, provisional application No. 61/098,389, filed on Sep. 19, 2008, provisional application No. 61/098,378, filed on Sep. 19, 2008.

(51) Int. Cl.
*B65G 43/00* (2006.01)

(52) U.S. Cl.
USPC ............... 198/810.01; 198/502.1; 198/810.03

(58) Field of Classification Search
USPC ................. 198/502.1, 502.4, 810.01, 810.02, 198/810.03, 810.4; 700/213
See application file for complete search history.

(56) References Cited

U.S. PATENT DOCUMENTS

| 3,597,756 A | 8/1971 | Jackson |
| 3,750,129 A | 7/1973 | Takeno et al. |
| 4,469,993 A | 9/1984 | Swanson et al. |
| 4,541,063 A | 9/1985 | Doljack |

(Continued)

FOREIGN PATENT DOCUMENTS

| DE | 4111358 A1 | 10/1992 |
| GB | 1328506 | 8/1973 |

(Continued)

*Primary Examiner* — Douglas Hess
(74) *Attorney, Agent, or Firm* — Shumaker Loop & Kendrick, LLP

(57) ABSTRACT

A system and method are disclosed for controlling a conveyor belt condition monitoring system, and for automatically providing user alarms and system trips when sensed conditions exceed acceptable values. The system may use sensors to measure magnetic disruptions ("events") in belt components and an algorithm may be used to monitor changes in these disruptions over time. The magnitude of these changes can then be used to predict when belt failures will occur. The system may also be used to sense when imminent failure of the belt will occur and to automatically stop the belt before failure occurs. An integrated display provides detailed information on the measured belt events and enables the user to customize alarm/trip levels and to assess problem as conditions via a virtual private network or the Internet while the belt is operating. The system is modular so that its features may be selectively integrated into existing facility-wide monitoring systems.

38 Claims, 13 Drawing Sheets

(56) References Cited

U.S. PATENT DOCUMENTS

| | | | |
|---|---|---|---|
| 4,577,502 A | 3/1986 | Cunningham | |
| 4,646,912 A | 3/1987 | Houck et al. | |
| 4,864,233 A | 9/1989 | Harrison | |
| 5,036,277 A | 7/1991 | van der Walt | |
| 5,059,903 A | 10/1991 | Otaka et al. | |
| 5,263,570 A * | 11/1993 | Stonemark | 198/502.1 |
| 5,383,014 A * | 1/1995 | Nowak et al. | 356/28 |
| 5,426,362 A | 6/1995 | Ninnis | |
| 5,453,291 A | 9/1995 | Sasahara et al. | |
| 5,493,216 A * | 2/1996 | Asa | 324/207.2 |
| 5,570,017 A | 10/1996 | Blum | |
| 5,957,263 A * | 9/1999 | Espenschied | 198/349.95 |
| 5,986,452 A | 11/1999 | Hockey et al. | |
| 6,032,787 A | 3/2000 | Kellis | |
| 6,047,814 A * | 4/2000 | Alles et al. | 198/810.02 |
| 6,232,774 B1 | 5/2001 | Kimura | |
| 6,264,577 B1 | 7/2001 | Hutchins | |
| 6,585,108 B2 | 7/2003 | Travis | |
| 6,587,812 B1 | 7/2003 | Takayama | |
| 6,712,199 B1 | 3/2004 | Bruckner et al. | |
| 6,761,263 B2 * | 7/2004 | Becker et al. | 198/810.01 |
| 6,781,515 B2 | 8/2004 | Kuzik et al. | |
| 6,831,566 B1 * | 12/2004 | Kusel | 340/676 |
| 6,852,050 B2 | 2/2005 | Sands et al. | |
| 6,853,874 B2 * | 2/2005 | Kawada et al. | 700/213 |
| 6,853,876 B2 * | 2/2005 | Wehrung et al. | 700/230 |
| 6,943,672 B2 | 9/2005 | Choi | |
| 6,988,610 B2 * | 1/2006 | Fromme et al. | 198/502.1 |
| 7,494,004 B2 * | 2/2009 | Stolyar et al. | 198/810.02 |
| 7,624,857 B2 * | 12/2009 | Kusel | 198/502.4 |
| 7,673,739 B2 * | 3/2010 | Freeman | 198/810.02 |
| 7,779,994 B1 * | 8/2010 | Travis | 198/810.02 |
| 7,894,934 B2 * | 2/2011 | Wallace et al. | 700/230 |
| 8,009,057 B2 * | 8/2011 | Smith | 340/676 |
| 8,074,789 B2 * | 12/2011 | May | 198/810.02 |
| 8,285,494 B2 * | 10/2012 | Vozner | 702/34 |
| 8,436,607 B2 * | 5/2013 | Alport et al. | 324/232 |
| 2002/0002414 A1 | 1/2002 | Hsiung et al. | |
| 2004/0262132 A1 | 12/2004 | Pauley et al. | |
| 2006/0202684 A1 | 9/2006 | Brown | |
| 2006/0247868 A1 | 11/2006 | Brandstrom | |
| 2007/0102264 A1 | 5/2007 | Wallace et al. | |
| 2007/0278068 A1 | 12/2007 | Wallace et al. | |
| 2008/0257692 A1 | 10/2008 | Wallace | |

FOREIGN PATENT DOCUMENTS

| | | |
|---|---|---|
| GB | 1 368 363 | 9/1974 |
| GB | 1487978 | 10/1977 |
| GB | 2 210 840 A | 6/1989 |
| JP | 57-180517 A | 11/1982 |
| JP | 04159911 A | 6/1992 |
| RU | 2016404 C1 | 7/1994 |
| SU | 1558814 A1 | 4/1990 |
| WO | WO-97/05047 | 3/1997 |
| WO | WO 2007-026135 A1 | 3/2007 |
| WO | WO-2008/070678 A3 | 6/2008 |
| WO | WO 2008-090522 A1 | 7/2008 |
| WO | WO-2008/090523 A1 | 7/2008 |

\* cited by examiner

BELT DATA TABLE/
BELT MAP 550

| SCROLLING INDEX | | | |
|---|---|---|---|
| 4 | Splice | 9.82 m from splice 2 | |
| 3 | Rip Panel | 7.54 m from splice 1 | |
| 2 | Rip Panel | 4.80 m from splice 1 | |
| 1 | Splice | 23.73 m from splice 1 | B92F |
| 11 | Damage | 20.03 m from splice 2 | Center |
| 10 | Rip Panel | 17.20 m from splice 2 | |
| 9 | Rip Panel | 14.57 m from splice 2 | |
| 8 | Rip Panel | 11.13 m from splice 2 | |
| 7 | Rip Panel | 9.33 m from splice 2 | |
| 6 | Damage | 7.23 m from splice 2 | Center |
| 5 | Rip Panel | 5.06 m from splice 2 | B92F |

SYSTEM AND METHOD FOR CONTROLLING A CONVEYOR BELT CONDITION MONITORING SYSTEM

REFERENCE TO RELATED APPLICATIONS

This application claims the benefit of International application No. PCTGB2006/003190 filed Aug. 29, 2006, and U.S. Provisional Ser. Nos. 61/098,389, 61/098,461, and 61/098,378, filed Sep. 19, 2008, each of which is hereby incorporated by reference.

FIELD OF THE INVENTION

The invention relates to systems for monitoring industrial conveyor systems and, more particularly, to a system and method for analyzing signals from conveyor belt system sensors to provide automatic fault monitoring and signal analysis.

BACKGROUND

Conveyor belts and conveyor systems are well known systems used for the transport of a variety of materials and products. Conveyor belts are designed and used in heavy materials transport applications such as coal mining, ore mining, cement manufacturing operations, and the like. In many such applications, conveyor belts are located in underground mines where access to long stretches of belt and conveyor components is severely limited. As can be appreciated, unexpected failures in conveyor belts in these limited access areas can be dangerous and can also cause substantial production delays.

As a result, methods and systems have been developed to monitor the condition of conveyor belts in operation to predict when failures may occur. If predictions are accurate, the conveyor system can be stopped and the belt repaired at a predetermined or more easily accessible location within the mine or above the ground surface in the case of underground conveyors. While current systems offer some degree of automated monitoring, there is still a need for a fully automated belt monitoring system that is capable of analyzing a variety of sensor data indicative of belt condition, and of triggering alarms to alert a user of the belt condition. There is also a need for an automated system that can sense a dangerous or imminent failure condition and can automatically stop the conveyor so that catastrophic system failure does not occur. Such a system should be sufficiently sensitive so that it successfully detects actual problem conditions, but should also be sufficiently discriminating that it avoids alarming or tripping where such responses are not warranted. Such a system should also meet or exceed applicable industry standards and regulations as well.

SUMMARY OF THE INVENTION

The disadvantages heretofore associated with existing systems are overcome by the disclosed design for a conveyor belt monitoring and analysis system. An automated industrial monitoring system is therefore disclosed, which includes a plurality of sensors for measuring a magnetic field in a conveyor belt component and a controller for receiving signals from the plurality of sensors. The controller is in communication with a processor executing instructions for (i) populating a table with event data representative of the signals, (ii) comparing a first set of event data from the table with a second set of event data received from at least one of the plurality of sensors, and (iii) triggering a user alarm if the second set of event data deviates from the first set of event data by a predetermined amount.

In one aspect of the invention, the system may be effective for automatically transforming the event data into a graphical representation for display to a user.

In another aspect, the system may be effective for automatically assigning the event data a rating corresponding to the magnitude of difference between a second waveform and a first waveform corresponding, respectively, to the second set of event data and the first set of event data.

In another aspect, the system may include a graphical user interface connected to the PLC so that a user may interact with and control said system.

In still another aspect, the plurality of sensors may be effective for analyzing the conveyor belt by defining separate channels, and each of the channels corresponds to an endless longitudinal section of the conveyor belt. A graphical representation of each of the channels may be automatically generated by the system for simultaneous display to a user.

In another aspect, the system includes recording means for automatically recording and storing event data relating to the conveyor belt component, including the date and location on the belt corresponding to the event data, when the system is operating in a learning mode or a monitoring mode, such that new event data relating to the conveyor belt may be recorded and stored for comparison with subsequently obtained event data relating to the belt.

In another aspect of the invention, the conveyor belt may include radio frequency identification (RFID) chips. The chip(s) may provide information to the system relating to the chip, a rip panel associated with the chip, or a belt splice associated with the chip.

In yet another aspect of the invention, a method for controlling a conveyor belt condition monitoring system is provided. The method is useful for controlling belt monitoring systems of the type that produce signals from conveyor belt system sensors to provide automatic fault monitoring and signal analysis. The inventive method comprises providing a programmable logic controller (PLC) for receiving the signals. The controller is in communication with a processor executing instructions for: (i) populating a table with event data representative of the signals; (ii) comparing a first set of event data from the table with a second set of event data received from at least one of the sensors; and (iii) triggering an alarm if the second set of event data deviates from the first set of event data by a predetermined amount.

In another aspect, the method comprises calculating a slope measurement at a plurality of points along a first waveform and at a plurality of points along a second waveform to determine deviations in event data.

In another aspect, the method includes recording first positive and first negative maximum amplitudes and second positive and second negative maximum amplitudes of each of said signals in order to determine deviations in event data.

In yet another aspect, the method may include automatically recording and storing event data relating to the conveyor belt component, including the date and location on the belt corresponding to the event data when the system is operating in a learning mode or a monitoring mode so that new event data relating to the belt is recorded and stored for comparison with subsequently obtained event data relating to the conveyor belt. The event data relating to the conveyor belt component may comprise an event waveform, and the method may include automatically recording said event data in a belt data table/belt map in the processor.

In still another aspect, the method may include operably connecting the system to a facility-wide monitoring system, an Intranet, a virtual private network and/or the Internet.

One object of the invention is to provide an improved system and method for controlling a conveyor belt condition monitoring system, which is capable of providing automatic fault monitoring and signal analysis. Related objects and advantages of the invention will be apparent from the following description.

BRIEF DESCRIPTION OF THE DRAWINGS

The details of the invention, both as to its structure and operation, may be obtained by a review of the accompanying drawings, in which like reference numerals refer to like parts, and in which:

FIG. 7 is a diagram of an exemplary data structure and indexing technique for use in handling data collected by the system of FIG. 1;

DETAILED DESCRIPTION

An improved system and method are disclosed for collecting, analyzing and managing data relating to the physical condition of conveyor belting systems. Specifically, the system collects data from sensors mounted adjacent to a conveyor belt and transmit the data to a computer system capable of analyzing the signals to determine whether a damage condition (e.g., rip, reinforcing cord break, splice failure) exists or will soon exist in the belt. The analyzed data is presented to a user in an interactive display format to enable the user to make affirmative decisions regarding further operation of the belt. The system also may be capable of predicting an imminent failure of the belt and may automatically stop the belt to avoid or minimize catastrophic damage to the conveyor system and/or loss of the materials being carried on the belt.

Figure 1:
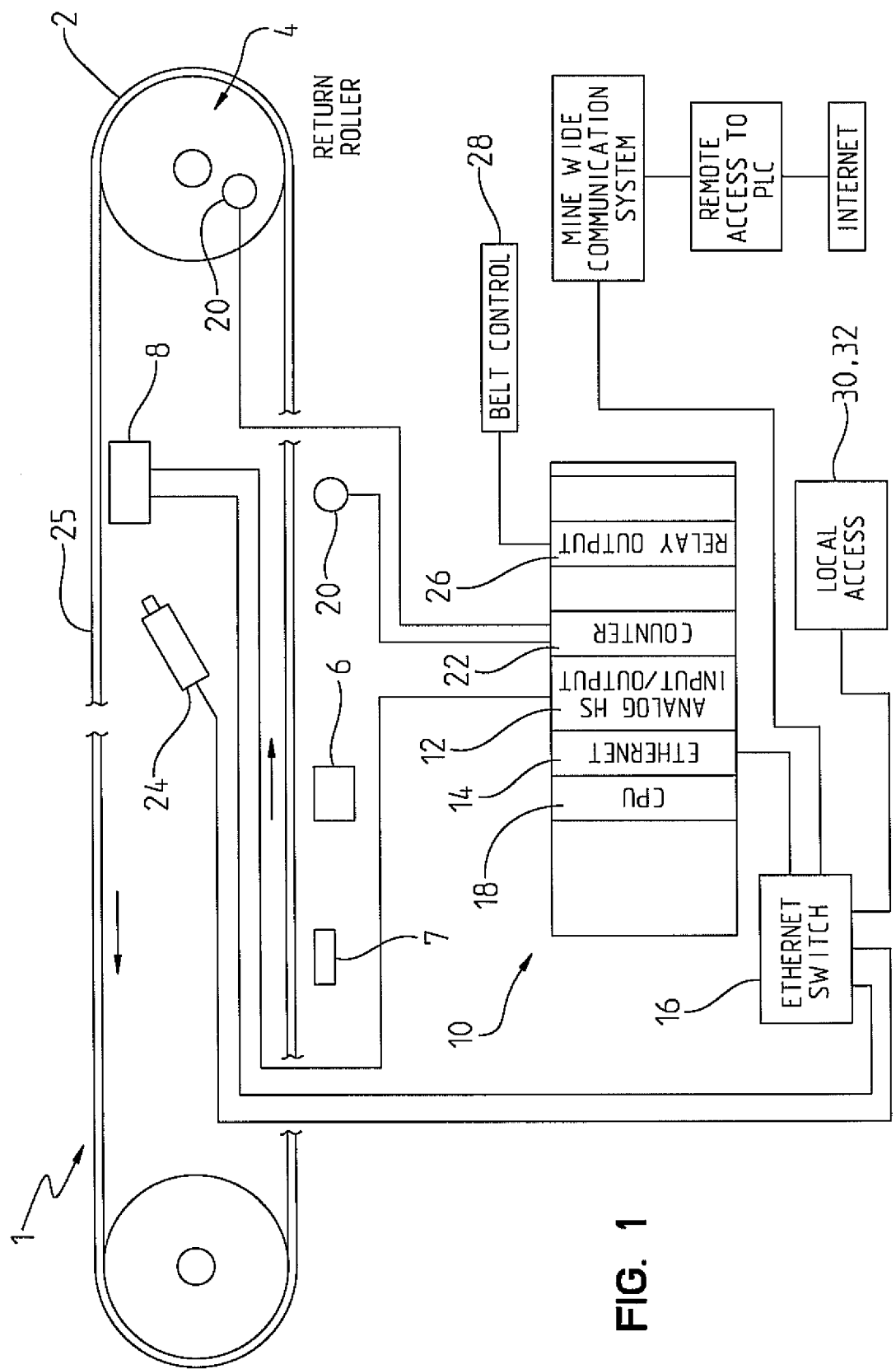
FIG. 1 is a schematic of a conveyor belt monitoring system.

Referring to FIG. 1, an exemplary conveyor belt monitoring system 1 is shown mounted adjacent to a conveyor belt 2 that moves in the direction shown by the arrows as a result of the rotation of one or more pulleys 4. The system 1 may comprise a permanent magnet 6 that spans the width of the belt 2 and is positioned above or beneath the belt in sufficiently close proximity that it magnetizes a portion of the belt 2. Specifically, the permanent magnet 6 will cause the magnetization of metal elements within the belt such as belt reinforcement cords, rip panels and splice joints. An improved conveyor belt monitoring system that may use the subject control system and method is described in Applicants' sister application, U.S. Ser. No. 61/098,389, now International application No. PCT/US2009/57064, which is incorporated herein by reference.

A series of sensors 8 are positioned across the width of the belt 2 at a location downstream of the permanent magnet 6. These sensors 8 detect disruptions in the magnetic fields induced by the permanent magnet 6. Such disruptions are known to be indicative of certain conditions in the belt. For example, the disruptions can represent a break or damage in one or more of the belt reinforcing cords. They can also represent a belt rip panel, or a belt splice joint. As will be described in greater detail later, disruption magnitudes and trends can be used to predict the short term and long term health of the conveyor belt 2.

The sensors 8 may be divided into groups, or belt channels, across the width of the belt so that two or more sensors 8 represent a single data channel for purposes of the analysis. In one exemplary embodiment, three channels divide the belt into three sections—left, center, right—for analysis. As will be appreciated, the sensors 8 may comprise electric coils, or they may be Hall Effect sensors.

The sensors 8 may be connected to a processing system 10, which in the illustrated embodiment is a programmable logic controller (PLC) rack system. The sensors 8 may be connected to the processing system 10 via a high speed analog input 12 (where the sensors comprise coils), or to an Ethernet input 14 via an Ethernet switch 16 (where the sensors comprise Hall Effect sensors). The signals received from the sensors are then directed to the CPU 18 for processing.

An encoder 20 may be used to obtain information on the velocity of the belt, and its signal may be input to a counter module 22 in the processing system 10. Encoder 20 may be integrated with the belt drive, as shown in FIG. 1.

The system 1 may further comprise a camera 24 for transmitting visual information regarding the top surface 25 of the belt 2 to enable the user to correlate information provided by the system with a visual indication of the belt at a desired location. The signal from the camera 24 can be routed to the processing system through the Ethernet switch 16. In addition, the camera 24 can be controlled (e.g., to take a snapshot at a targeted location) via a relay output module 26 of the processing system 10 such that it can be operated to automatically take a picture based on a triggering event tied to the processing system. The relay output module 26 may also provide a connection to a belt control system 28 to stop the belt 2 where the processing system 10 predicts an imminent failure condition in the belt. The belt control system 28 may be part of a larger mine monitoring system.

As will be appreciated, more than one camera 24 may be provided. Any or all of these cameras may be high definition cameras that are position adjustable and incorporate a zoom function. Such an arrangement may allow the system (or a user) to adjust the camera(s) to focus on particular areas of interest. The information from the camera may be incorporated into an e-mail and sent to a local or remote user.

A graphical user interface or user input and monitoring console 30 may be provided to enable a user to interact with and control the processing system 10. In addition, the system 1 may include a local display 32 that can be positioned near the belt 2. The console 30 and local display 32 may be connected to the processing system via the Ethernet switch.

Providing a local display may be advantageous for applications in which the console 30 is located in a remote control room or other remote location away from the conveyor belt. In one example, the console 30 may be located in a different geographic location from the conveyor belt, and may be connected to the processing system 10 via virtual private network, Intranet, the Internet, or other data communications system. In such instances, the local display 32 would provide local operator access to the information generated by the processing system 10.

Figure 2:
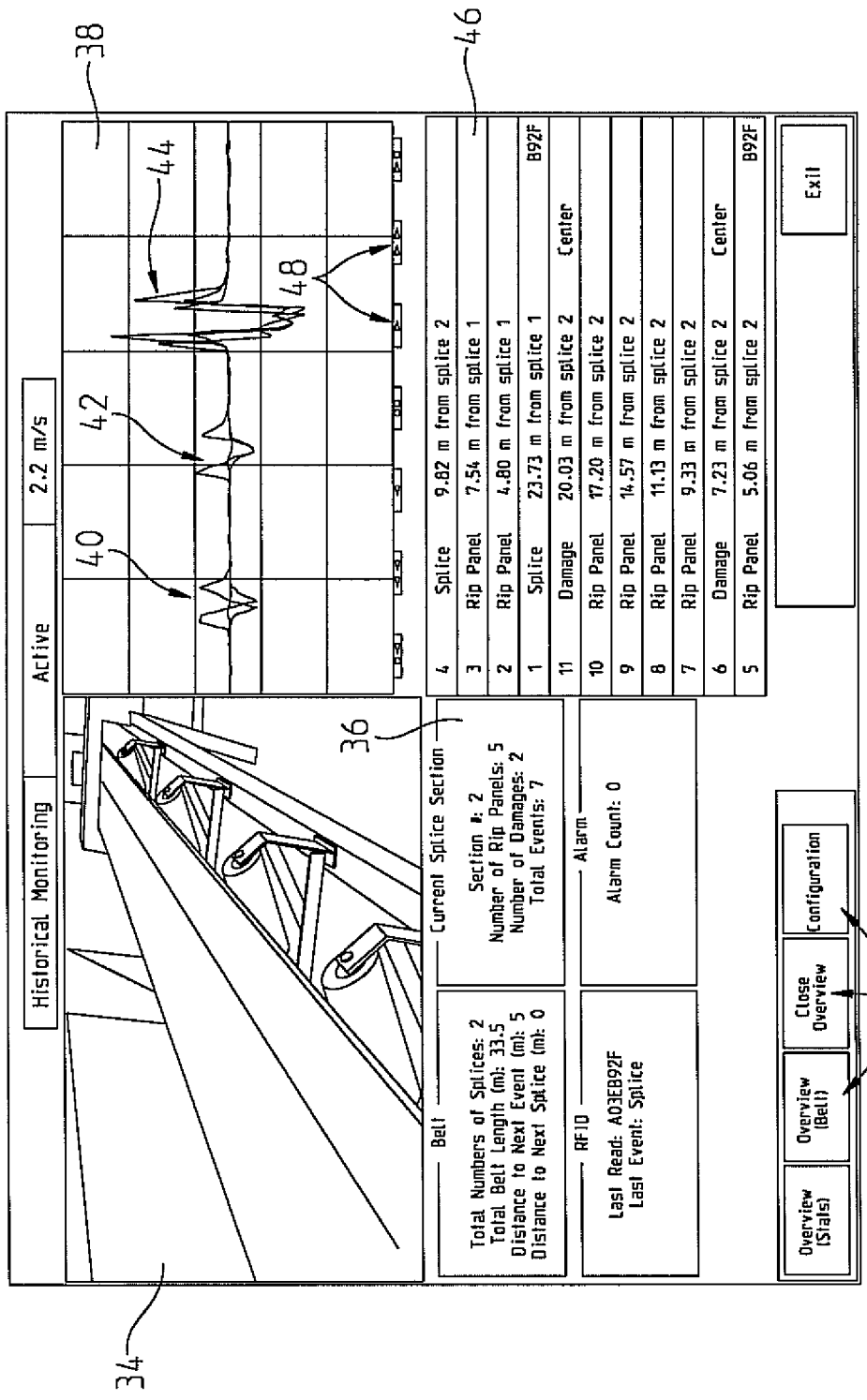
FIG. 2 is an exemplary computer display generated from data collected by the system of FIG. 1.

Referring now to FIG. 2, an exemplary user/operator display screen is shown. This is an example of the display that would be shown on the user input and monitoring console 30. Portions of this display would also be available for viewing via the local display 32.

In this exemplary display, the screen is cut into four windows. The first window 34 shows a picture or live video feed from the camera 24. The second window 36 contains information about the belt, including the total number of splices in the belt, the total belt length, distance to the next belt event and distance to the next splice. For the purposes of this disclosure, an "event" may be defined as anything that is observed on the conveyor belt, good or bad. Examples of observed "events" include (1) splice joints, (2) rip panels, and (3) generalized belt damage. The system 1 monitors these events to ensure that the user is aware of any changes in the events (e.g., rips in rip panels, unacceptable increase in damage, splice joint degradation) so that appropriate action may be taken. In some cases, the system 1 can operate to shut the belt down automatically if the magnitude of a change in a particular event exceeds a predetermined amount.

The second window 36 may also contain a count of the total number or events recorded for the belt (number of rip panels, number of damage spots, etc.). It may also contain information regarding the number of alarms triggered for the belt. Where the belt contains radio frequency identification (RFID) chips associated with belt splices or rip panels, information regarding the RFIDs and their associated splice/rip panel may be provided. Applicants' sister application, U.S. Ser. No. 61/098,378, now International application No. PCT/US2009/57063, which is incorporated herein by reference, discloses examples of rip panels that may be used with the described system 1. Soft keys 37 at the bottom of the second window of FIG. 2 may be provided to allow toggling between different display information to enable the user to customize the display to show a desired set of data for the monitored belt.

A third window 38 may provide a graphical representation of the signals received from the sensors 8. This representation can be shown as a real time feed, or it can be stopped to enable the user to view a particular event in detail. In the illustrated embodiment, a graphical representation of each of three channels is provided, although greater or fewer than three channels may also be shown, depending on the system. Three "events" are shown in the illustrated screen. The left two events 40, 42 represent rip panels, while the rightmost event 44 represents a splice joint.

The fourth window 46 may provide a listing of events recorded for the particular belt 2 being monitored. As can be seen, a listing of the events (splice, rip panel, damage) is shown, as is the distance of each event from a known location on the belt (e.g., a splice joint). This list may scroll so that the topmost event listed corresponds to that event's graphical depiction in the third window 38. For events that represent belt damage, the listing may also provide more detailed information about where across the belt the damage exists (e.g., right, left, center). Additionally, for events that represent splice joints, information may be provided to identify the type of splice joint present (e.g., B92F).

The user may view information about a particular "event" in the listing simply by clicking on that "event," whereupon the graphical signal representation will be shown above it in the third window 38. Likewise, standard control buttons 48 are provided in the third window 38 to enable the user to control the graphical signal representation. As will described in greater detail later, a variety of other display options may also be provided.

Figure 3:
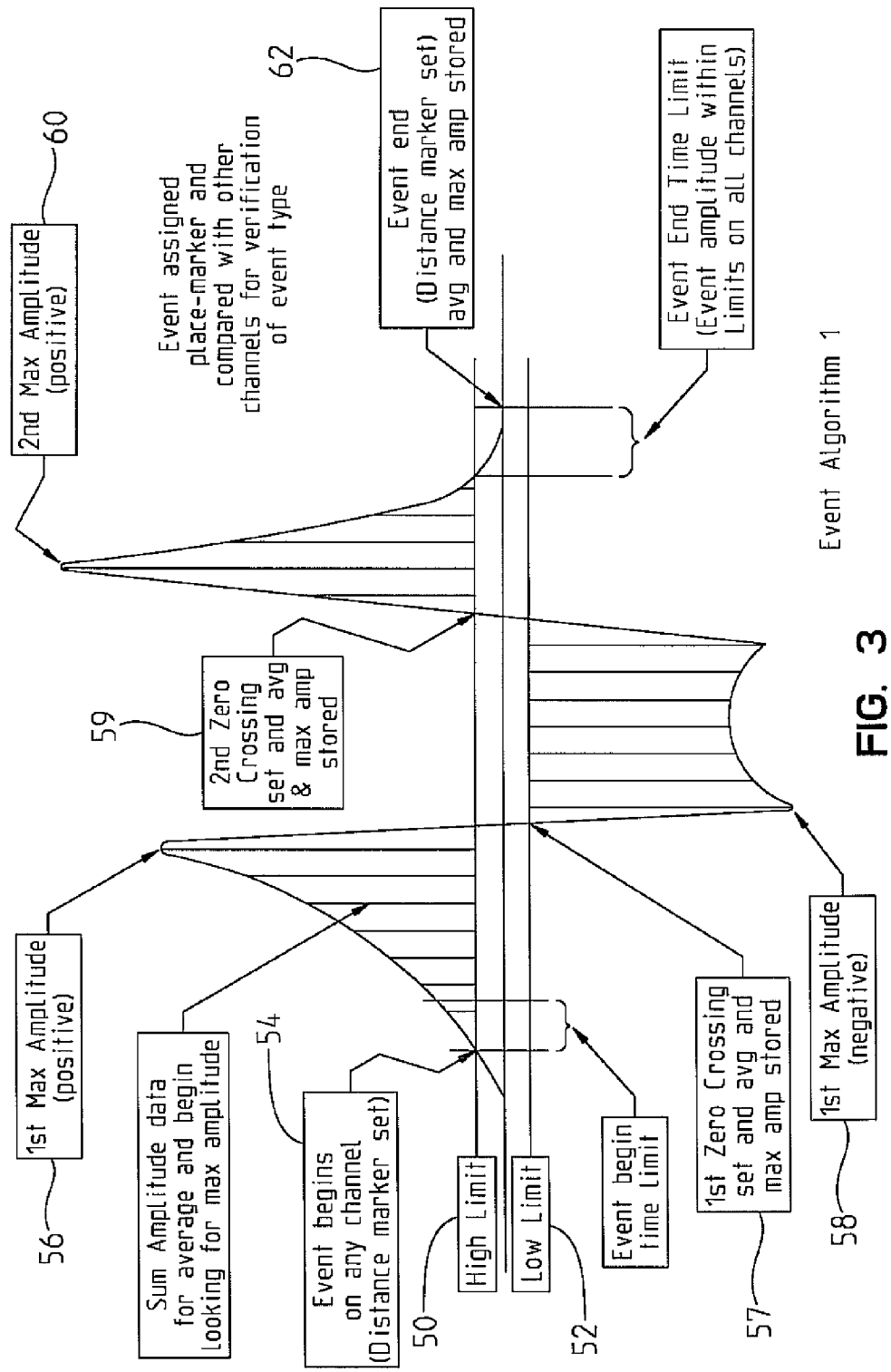
FIG. 3 is an exemplary depiction of a event observed by the system of FIG. 1.

Referring now to FIG. 3, a generalized description of signal data collection for an exemplary splice joint "event" is shown. The graph shows the signal history, generated on a single channel, resulting from a magnetized splice joint passing the sensors 8. Where the sensors 8 provide more than one channel of sensing, the FIG. 3 data recording function is performed for each channel individually, enabling on-going monitoring of the conveyor belt events on a per-channel basis.

For a length of conveyor belt 2 that is not damaged or does not have a rip panel or a splice, the steady state reading from sensors 8 is nominally zero. Thus, to sense the beginning of an event the system 1 sets high and low reading limits 50, 52 and begins recording data only when that high or low limit is crossed for a predetermined minimum period of time (see, Event Begin Time Limit, in FIG. 3) to avoid false events. In the illustrated embodiment, splice event begins at 54 where the signal crosses the high limit 50 on any channel being recorded. At this point 54, the system sets a distance marker, which is a reading from the encoder 20, and begins recording signal data (i.e., summing signal amplitude data to determine an average and also to look for maximum positive amplitude) until the signal crosses back down through the low limit 52. Average and first maximum amplitude (positive) 56 of the signal are then stored.

When the signal passes through the low limit 52, the system also sets a first zero crossing point 57 and again records signal data (once again, summing signal amplitude data to determine an average and also to look for a maximum negative amplitude) until the signal passes back across the low limit 52. The system sets a second zero crossing point 59, and stores average and first maximum amplitude (negative) 58 of the signal. The signal again passes through the high limit 50 and signal data is once again recorded (summing and searching for the second maximum positive amplitude) until the signal crosses back down through the high limit 50, whereupon the second average and second maximum positive amplitude 60 of the signal are recorded. When the signal remains between the high and low limits 50, 52 for a predetermined period of time (see, Event End Time Limit in FIG. 3) on all recorded channels, the event ends 62, the system sets a second distance marker to identify the boundaries of the event, and average and maximum amplitudes are stored.

The system 1 stores all of this information as an "event," noting the time and location on the belt. Thus, baseline data regarding this particular splice joint is used to compare against data collected for that splice joint the next time the joint passes the sensors 8. Any changes from previous readings may be noted, and the user can be alerted of significant changes from previous readings. For example, each time an event is triggered, the system 1 may send an alarm such as sending a warning e-mail, taking a photographic snapshot of the belt using the camera 24, or some other action. The specific action required may be pre-set by the user (e.g. fifteen percent increase or decrease in maximum amplitude from previous reading).

Thus, a user need only look at the event and sign off on it if it goes above a certain value. A historical catalog of such acceptances of a particular event is stored and is available for viewing via the display screen (FIG. 2). The algorithm will then only signal an alarm based on the last previous event (i.e., fifteen percent greater or less than the last accepted event). Of course, this can be modified so that an additional five percent increase/decrease will alarm, etc. For significant changes (i.e., associated with an imminent catastrophic damage condition), the system 1 may cause an automatic trip of the conveyor belt 2 by sending an appropriate signal to the belt control system 28.

Hence, the system 1 may, for example, be set up to require a trip (i.e., belt stop) if the maximum signal amplitude is twenty percent greater or lower than the last previous run, and may require merely an alarm if the maximum signal amplitude is ten percent greater or lower than the last previous run.

Figure 4:
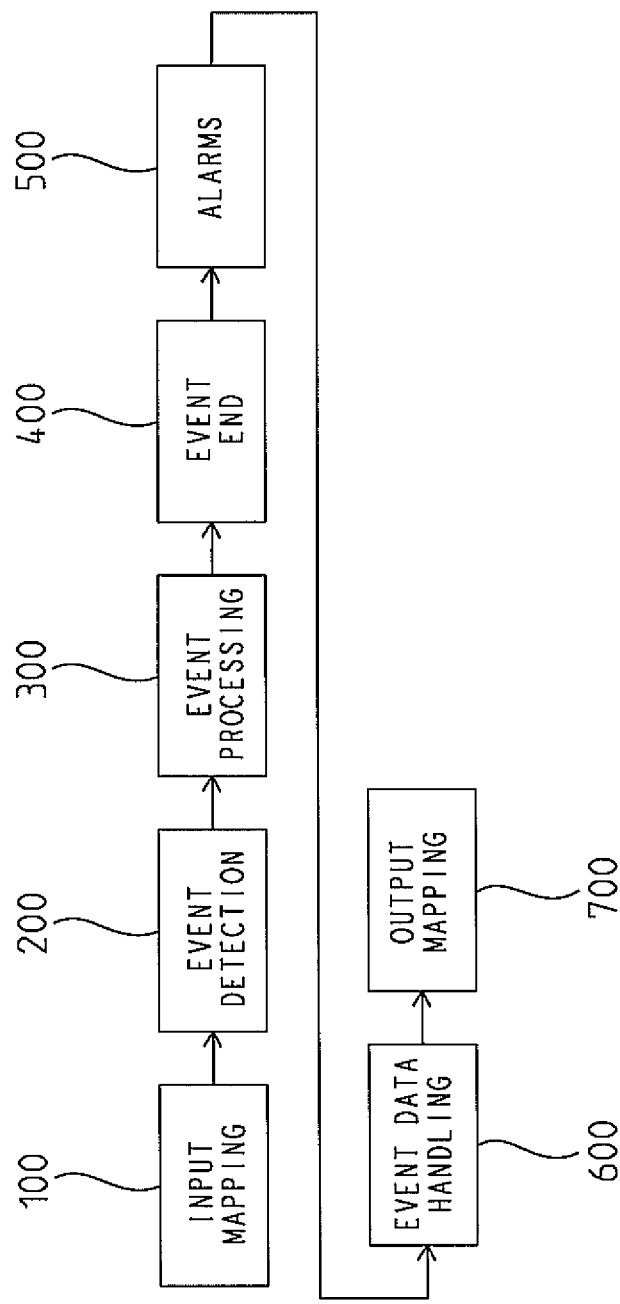
FIG. 4 is a flowchart describing exemplary processing steps for analyzing data collected by the system of FIG. 1.

It will be appreciated that although the foregoing description relates to the data recording process for a splice joint "event," similar principles are applicable when recording damage-type events and rip-panel events. Referring now to FIG. 4, the data processing flow of the system 1 will be described in greater detail.

At step 100, input mapping is performed, in which sensor data paths are mapped to the appropriate locations in processor 18 of the PLC. Speed scaling of the signals is implemented in this block to normalize the signals from the sensors based on the speed at which the belt is traveling. This may be important because signal voltage increases as belt speed increases. Thus, while a sensor may output a maximum 100 millivolt (mV) signal for a particular "event" at a belt speed of one meter/second (m/s), the same event may generate a 300 mV signal in the sensor at a belt speed of three m/s. The inventors have discovered that an appropriate normalization is achieved by dividing the sensed signal by velocity.

At step 200, the event detection block determines whether an event has occurred. As previously noted, an event is detected when the signal from a sensor goes above the high limit 50 or below the low limit 52 set by the system for a predetermined period of time. When an event is detected on at least one channel, the system considers an event to have occurred on all channels and thus all channels will be recorded. It is expected that the high and low limits 50, 52 may not be universally equal for all conveyor belts, and may depend on the nature (type, age, etc.) of the belt being monitored. Belt-specific high and low limits will, therefore, likely be set during an initial conditioning step. Customizing the high and low limits 50, 52 to a particular belt will ensure that only valid events are detected.

At step 300, the event processing block collects information regarding the event waveform. This event waveform information is placed in a temporary table for all enabled channels until the event is complete, whereupon the data is written into the belt data table/belt map in the processor memory 18.

At step 400, the event end block detects the end of an event. This occurs when the signal is "flat-lined" for all channels (i.e., the signal is between the high and low limits 50, 52). At this point the system 1 determines what kind of event took place (e.g., rip panel, splice, general damage) based on the general form of the waveform. For example, a splice joint event may have three maximum amplitudes and two zero crossings, while a rip panel event may have two maximum amplitudes, only one zero crossing, and a zero signal in the center channel. Generalized damage may be anything that does not conform to the splice or rip-panel pattern. The system is capable of recognizing these characteristics and classifying the event appropriately. At this point the data from the temporary table is placed in the belt data table/belt map.

Figure 5:
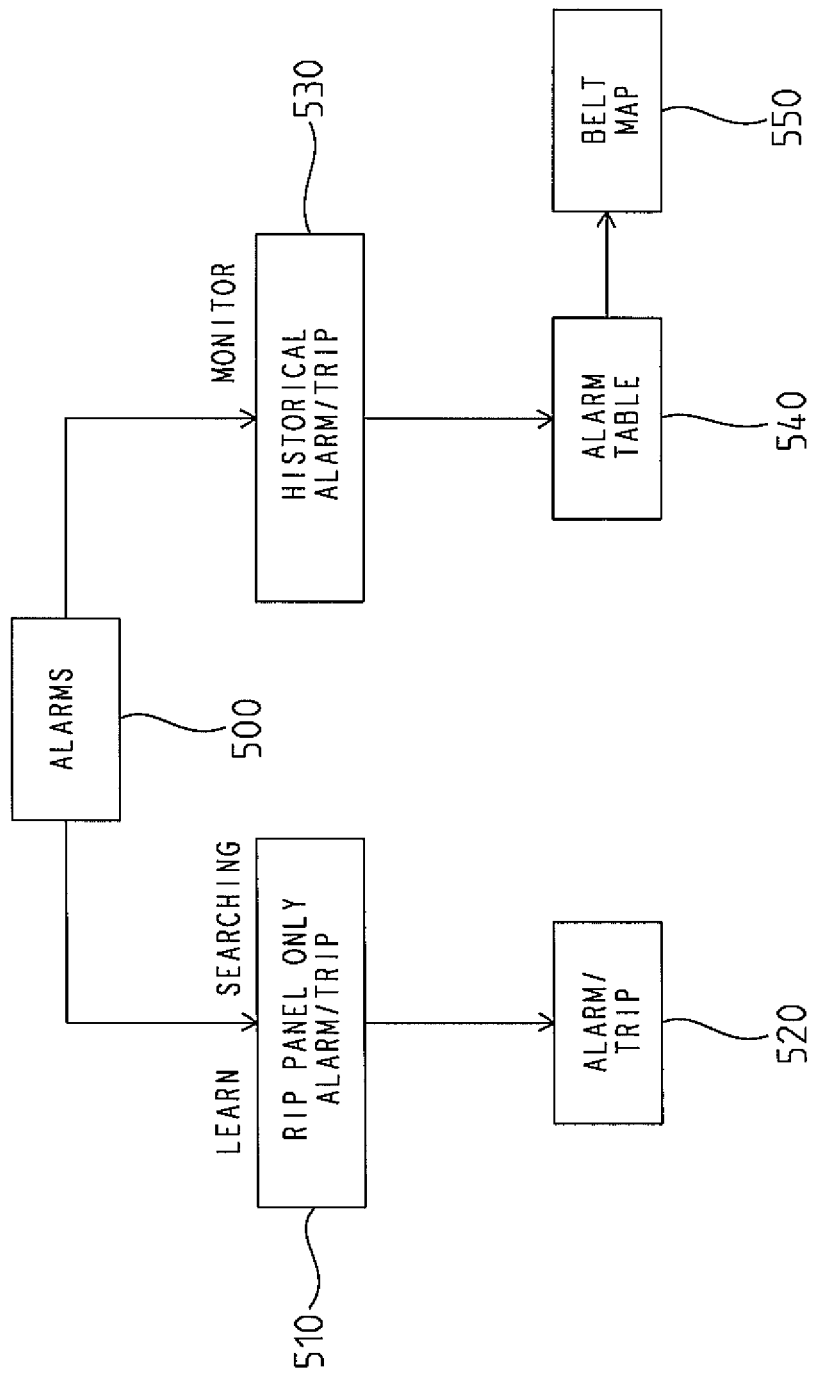
FIG. 5 is a flowchart describing exemplary processing steps for analyzing alarm conditions for a conveyor belt monitored by the system of FIG. 1.
Figure 6:
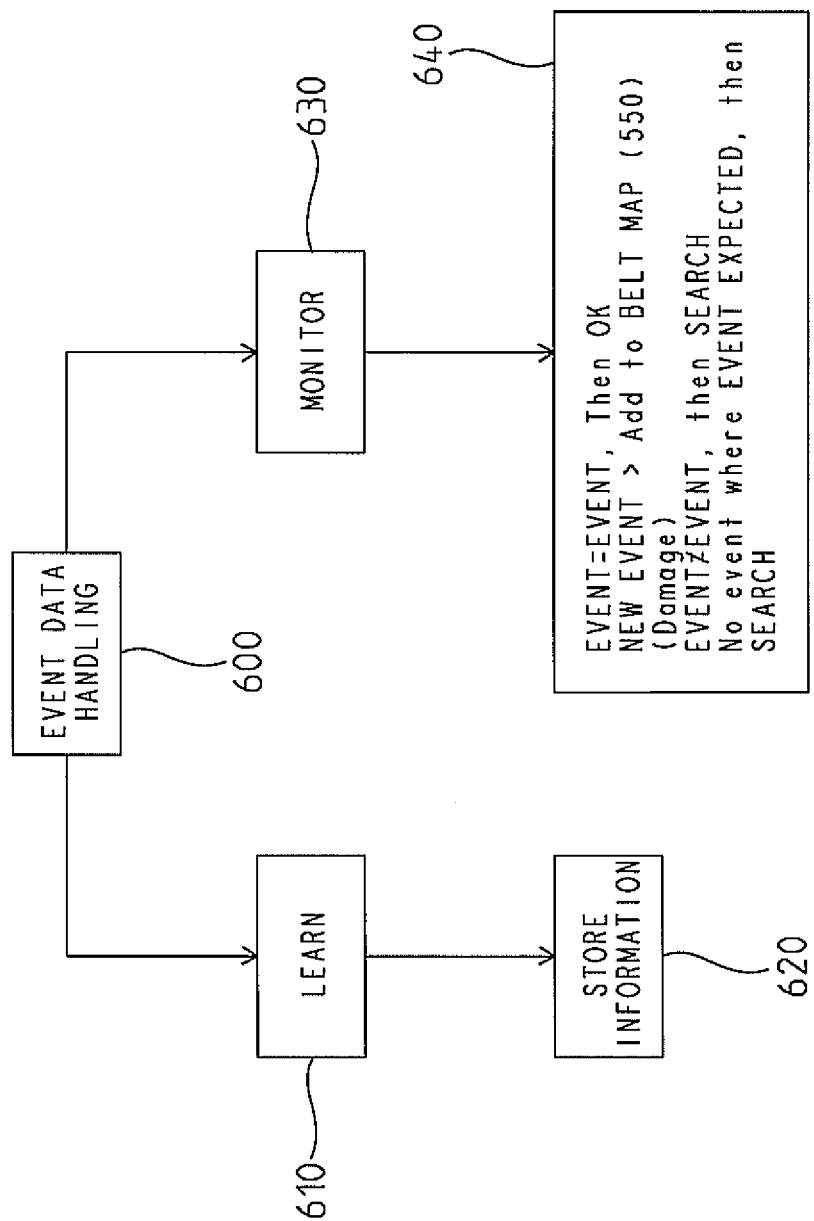
FIG. 6 is a flowchart describing exemplary processing steps for analyzing data representative of events occurring in a conveyor belt monitored by the system of FIG. 1.

At step 500, the system determines whether, based on the data collected during the event, an alarm or trip should be ordered. Referring to FIG. 5, the alarm decision is made depending on whether the system is operating in the "learning," "searching," or the "monitoring mode." The learning mode is implemented during the initial conditioning of the belt, where the system is initially learning the events that exist on the belt. Learning is automatic and is typically performed on initial system startup with a new belt (or where the new system is implemented to begin monitoring a belt that has already been in service). Thus, upon the initial revolution of the belt, the system 1 will sense the signals from the sensors 8 and will populate the belt data table/belt map with an initial set of events.

Searching mode is implemented, not on a new belt, but rather when the system 1 encounters an unexpected event (e.g., a splice or rip panel in an unexpected location). Such an occurrence of an unexpected event is an indication that the system 1 has lost its registration of the belt, and thus a searching of the events on the belt is performed to reset the system.

When operating in learning and searching modes, alarms are set only for rip panel events. (Block 510) Thus, if the rip panel event signals exceed the preset limits, an alarm or trip is ordered at step 520. Although the tolerance is rather wide, this presents a degree of protection for the rip panels until the monitoring mode is established or reestablished.

When operating in monitoring mode, (block 530), sensor readings for current "events" are compared to the readings from the stored data table for the same event. If the sensor reading exceeds the alarm limit (e.g., ten percent higher than the last revolution), then an alarm is ordered. Likewise, if the sensor reading exceeds the trip limit (e.g., twenty percent higher than the last revolution), then a trip is ordered. Data relating to the alarm or trip is written into an Alarm/Trip Table 540 indexed to the particular event. This data is then written into the belt data table 550.

In one embodiment, the tolerances for each waveform are customized per event, and are not generic for all of the events in the belt. Thus, the high and low tolerances for alarm and trips may be customized for each particular event (rip panel, splice, generalized damage) on the belt. They may even be different within groups, providing different tolerances for different types of splices or rip panels. This allows a tighter control over the max/min allowable sensor reading for each rip panel or splice.

When the system is operating in monitoring mode (530), comparison of the current event waveform to the historical waveform stored for the same event is performed as soon as the event is identified rather than waiting for the event to end to perform the comparison. This can result in a savings in computing time.

At step 600, the event data handling block manages the data by determining whether the event is a new event or an old event (i.e., one that has previously been detected). During the initial startup of the belt, the system is in learning mode 610 in which it stores (at step 620) all the data about the splices, rip panels and existing damage in the belt data table/belt map. While this learn mode occurs during startup, it can also occur after splice or rip panel configuration changes.

After the initial learning mode is completed, the event data handling block runs in "monitor" mode 630. In monitoring mode, the system monitors the events as they occur, determining whether they are new events or old events. At step 640, the system determines whether the event is new, old, or indicative of a loss of registration. Thus, if the detected event is expected (i.e., the system detects a splice, and the next expected event at the sensed location based on historical performance is a splice), then the system continues on to the next event. If the detected event is a new event (e.g., generalized damage is detected but there is no expected event at the sensed location), then the event is added to the belt data table/belt map 550. This is typically the case when new damage to the belt is observed for the first time. An event is considered to be "old" if an event of its type has been identified in the same location during previous revolutions of the belt. If the system detects a rip panel or splice at a location on the belt where, based on historical data, no such rip panel or splice is expected, then the system is diverted into "searching" mode. Such a condition may indicate that the system has lost its registration.

When a loss of registration occurs, the system will first attempt to compare the incoming events with previously stored unique identifiers. These unique identifiers (e.g., RFID chips, mechanical uniqueness such as two rip panels in a row followed by a particular type of splice, splice signature, rip panel signature), are originally stored when the system 1 is operating in learning mode, and the identifiers are associated with events specific to a particular belt or component on the belt. Thus, to re-register the belt in searching mode, incoming events are compared against these unique identifiers and once a match is determined, the system can resume operation in monitoring mode. The unique identifiers can be identified in a separate table, or they may be identified in a particular location in the belt data table/belt map. If the belt cycles through a complete revolution and no event match is obtained, then the system may return to learning mode to re-learn the events on the particular belt.

At step 700, the output mapping block outputs the result of the event analysis to the user. This output can be an alarm, an e-mail alert or message, a trip order to stop the belt, or the like.

Referring to FIG. 7, the belt data table/belt map 550 will be described. The data table 550 will contain information regarding each of the events detected in the belt. The data table 550 is originally populated with event data when the system is operated in learning mode. New data regarding an event is written into the data table 550 when an alarm condition occurs for the event and the user acknowledges the event as acceptable so that belt operation may continue.

The belt data table 550 contains information regarding all of the events observed on the belt (e.g., waveform, etc.). This table is originally populated with event data when the system is operated in learning mode. As new events such as belt damage, for example are observed, data representative of these new events are written into the belt data table 550 in descending order.

A scrolling index 560 may then be used to provide a cross-reference between the events, in the order in which they occur on the belt, and the location of the respective event data in the belt data table 550. Thus, in the initial belt learning mode, the system registers the events in order (events "1"-"5" in FIG. 7). Then, in monitoring mode, when a new event is observed (e.g., event "6" in FIG. 7), the new event identifier is placed into the scrolling index in a manner that represents its physical location on the belt (i.e., new event "6" is observed between known events "2" and "3"). The scrolling index is referenced by the system 1 when the system searches for the next expected event.

Thus, as new events are observed, reorganization of the scrolling index is all that is required. No reorganization of information in the belt data table 550 is necessary, which saves substantial processing time.

Figure 8:
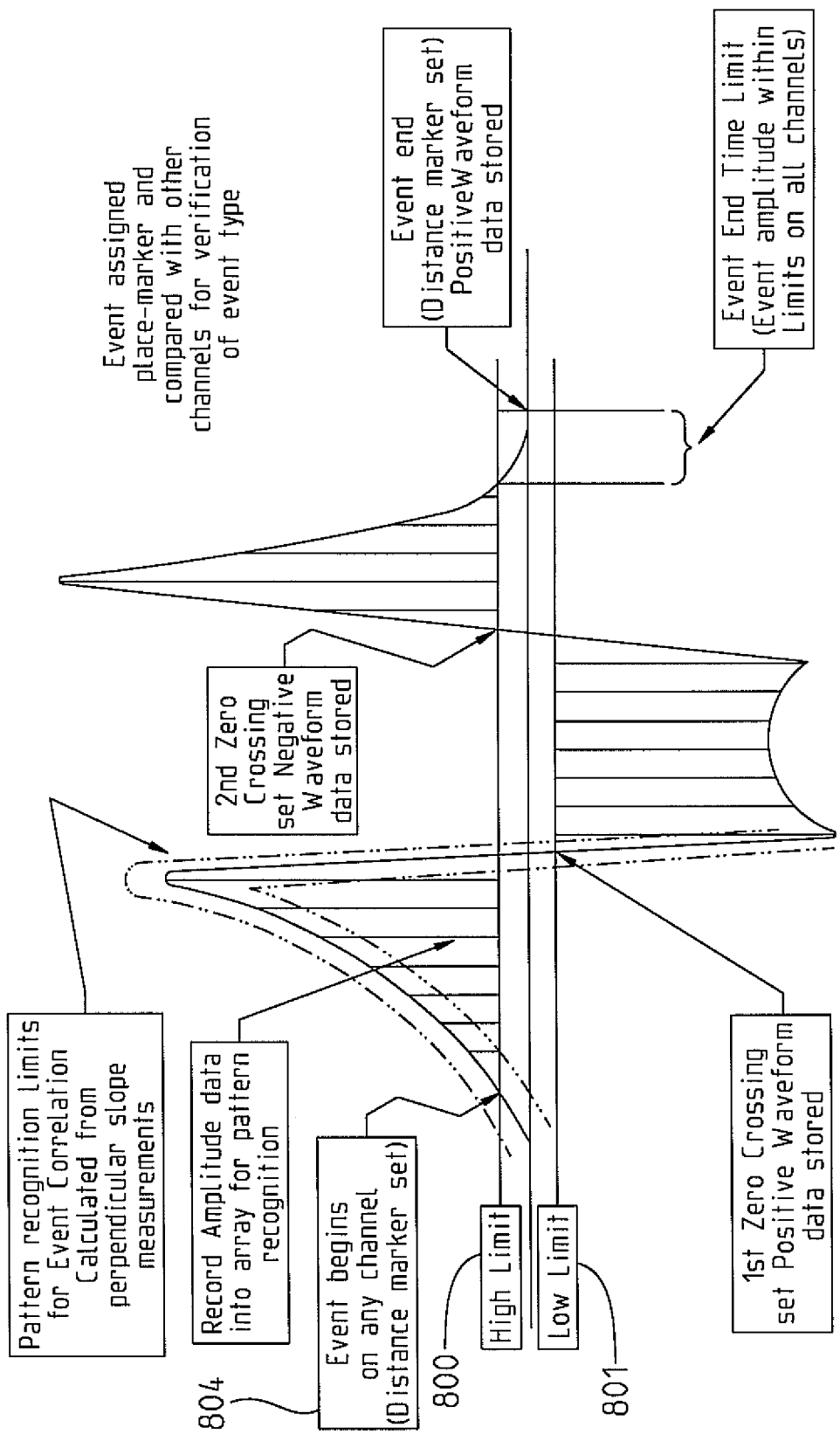
FIG. 8 is an exemplary depiction of an alternative pattern recognition technique for analyzing the event of FIG. 3.

FIG. 8 shows an alternative event analysis technique to that described in relation to FIG. 3 in which a pattern recognition approach is used to provide finer-sensitivity in event monitoring. In the FIG. 8 approach, the splice joint event is sensed and the system begins recording data when one of the high and low reading limits 800, 802 is crossed. In the illustrated embodiment, the splice event begins at 804 where the signal crosses the high limit 800. At this point 804, the system sets a distance marker (i.e., a reading from the encoder 20), and begins recording signal amplitude data into an array for pattern recognition. High and low pattern recognition limits are set based on expected slope measurements at a plurality of locations along the curve.

Any of a variety of well known techniques may be used to calculate the slope of the curve at discrete locations. If the measured slope for an event deviates from the expected slope measurement at any of these points, or deviates with respect to an expected change in slope over time, an alarm or trip is ordered. This approach provides enhanced sensitivity to the event monitoring process because it is capable of identifying small deviations in the event curve that would be masked using the averaging procedure in the technique described with respect to FIG. 3. This slope calculation technique, however is substantially more processor intensive than the technique of FIG. 3.

As with the technique of FIG. 3, this pattern recognition technique may also record first and second zero crossings, and may also store in the belt data table 550 data representative of the measured positive and negative waveforms to enable later event comparison at the next revolution of the belt.

Figure 9A:
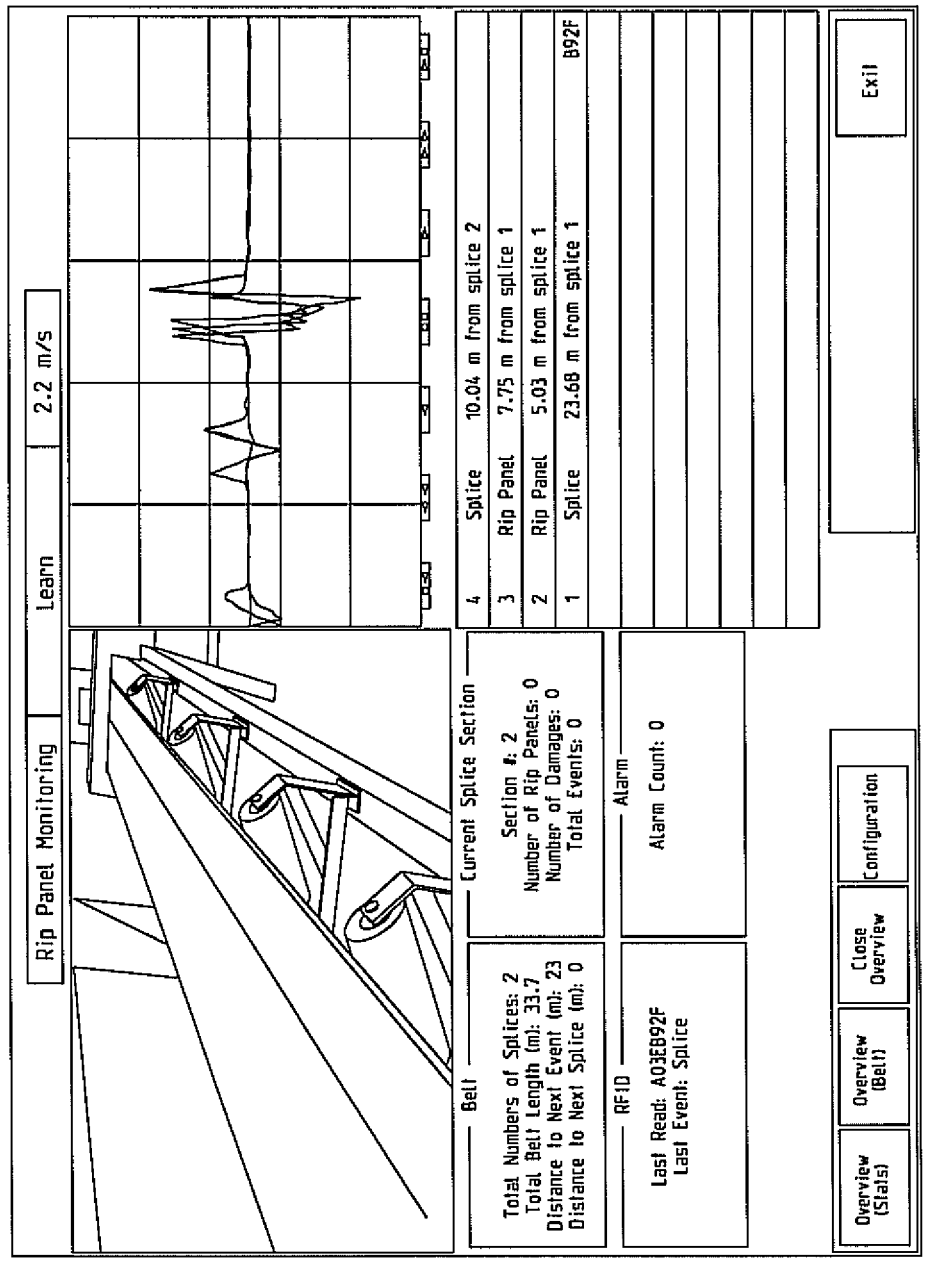
FIG. 9A is an exemplary computer display showing the system operating in learn mode, in which four events have been learned and are populating the belt data table.
Figure 9B:
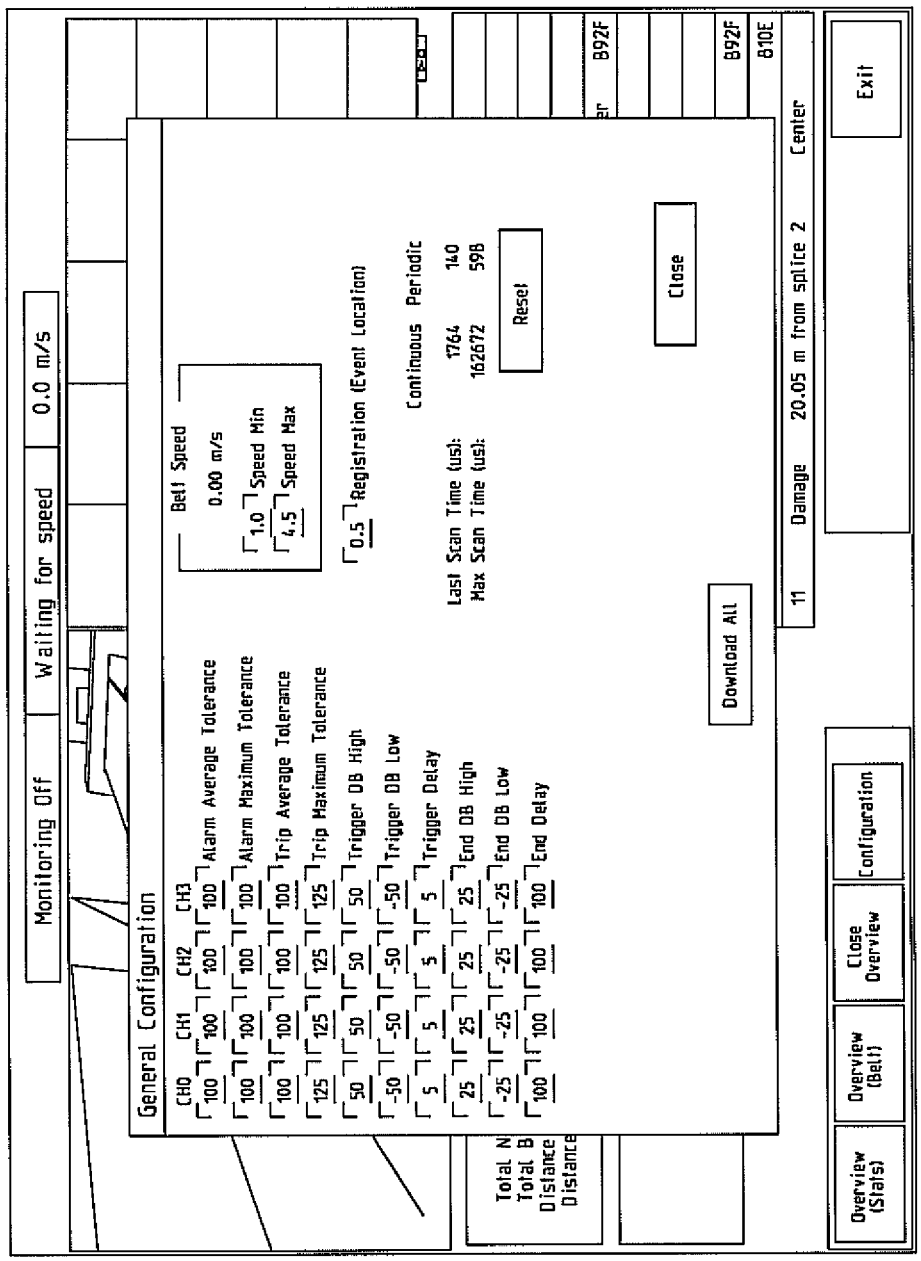
FIG. 9B shows the customization screen for setting alarm and trip tolerances associated with a particular conveyor belt, in which parameters governing three belt channels are being configured.
Figure 9C:
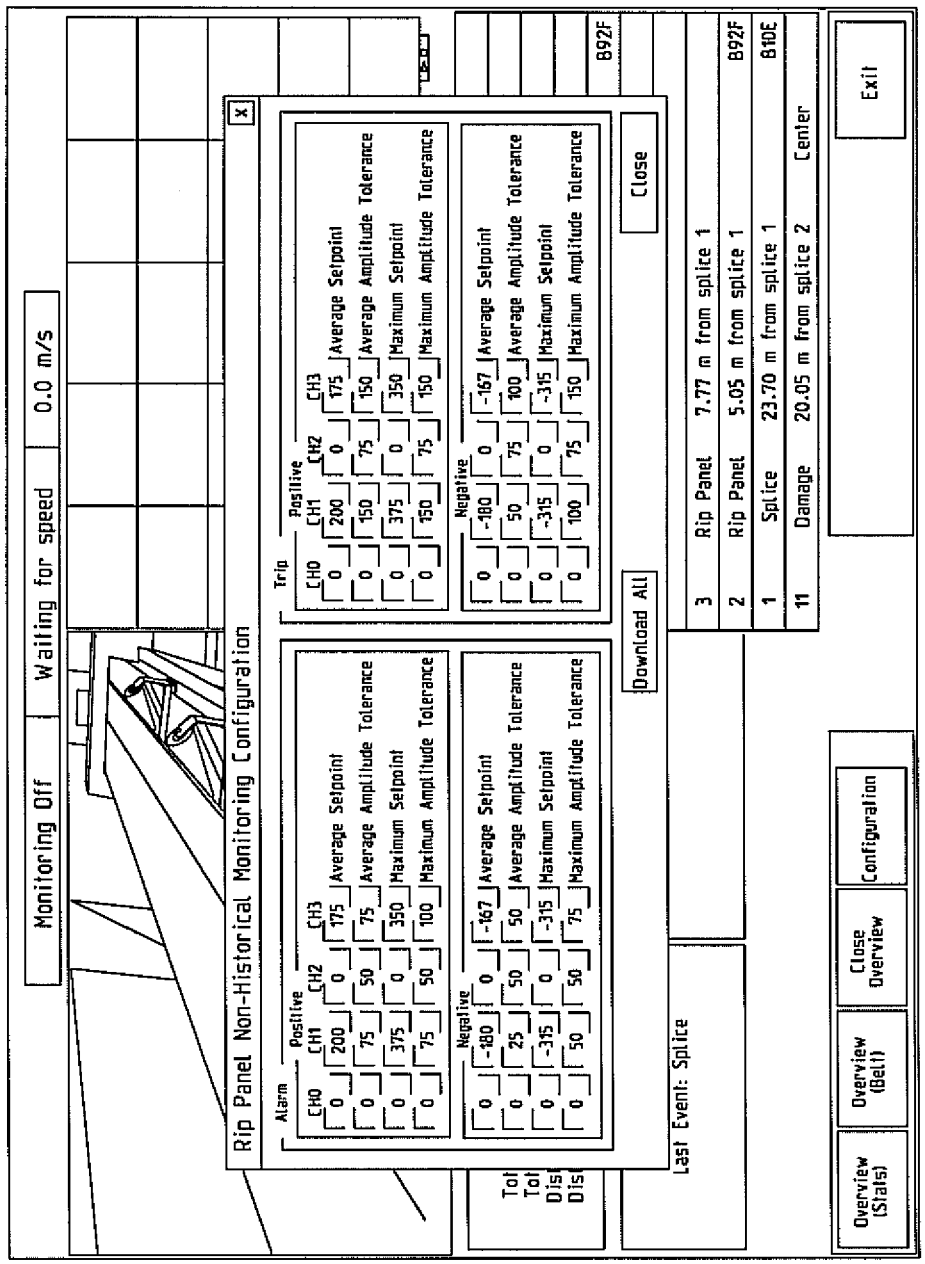
FIG. 9C illustrates a screen for a general configuration for alarm and trip tolerances for the non-historical monitoring configuration.

FIGS. 9A-9E show various alternative information configurations for display on the user input and monitoring console 30. Thus, FIG. 9A shows the system operating in learning mode, in which four "events" have been learned and are populating the list in the lower right quadrant of the screen. A corresponding graphical representation of the input signals is shown above the list. FIG. 9B shows a general configuration of alarm and trip tolerances for the historical monitoring configuration, showing how the system can be customized to provide a plurality of individual alarm and trip tolerances on a per-channel basis. FIG. 9C shows a general configuration of alarm and trip tolerances for the non-historical monitoring configuration.

Figure 9D:
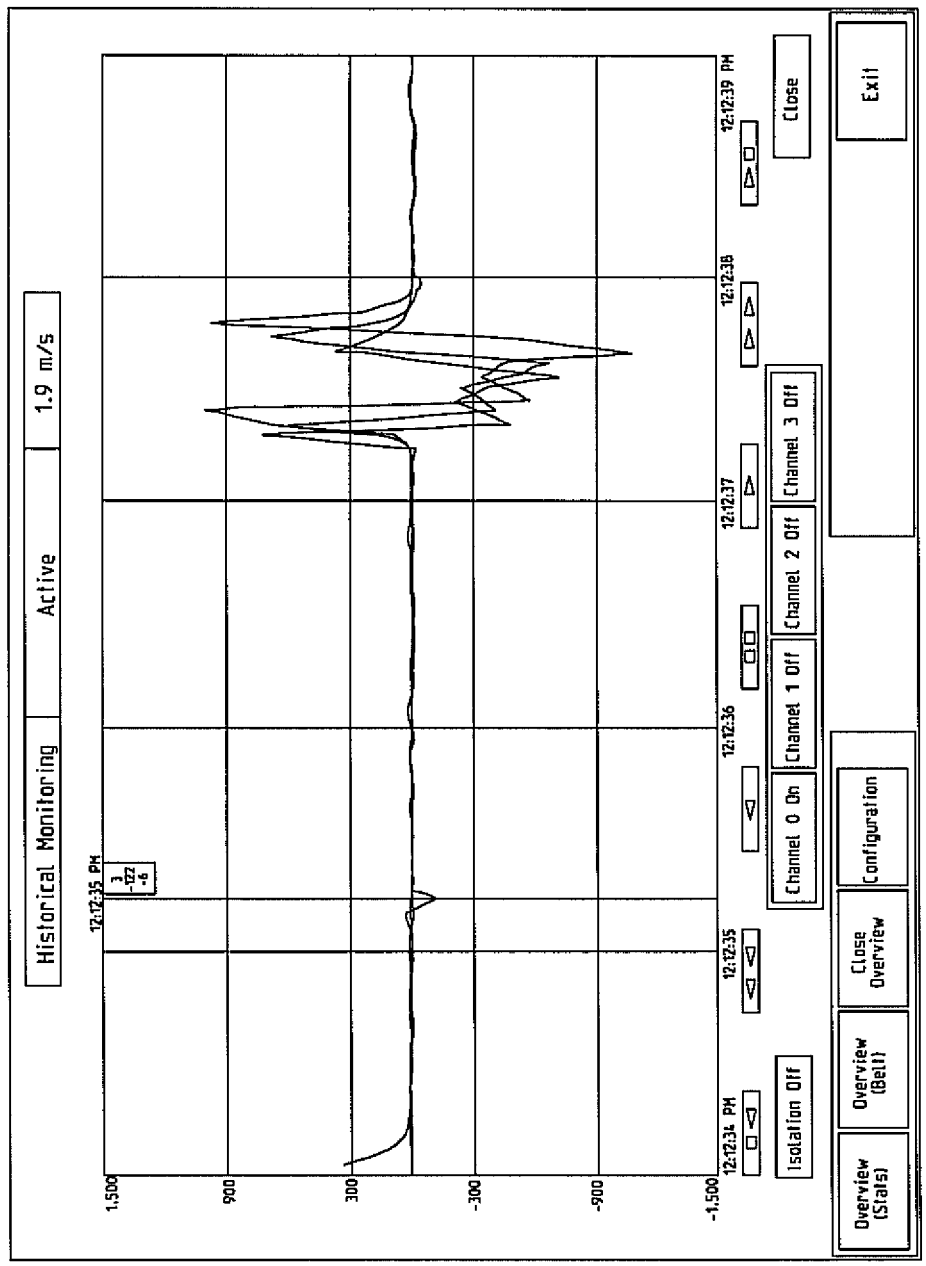
FIG. 9D shows a full screen display of an exemplary splice joint event, wherein the individual channels are shown in different colors.
Figure 9E:
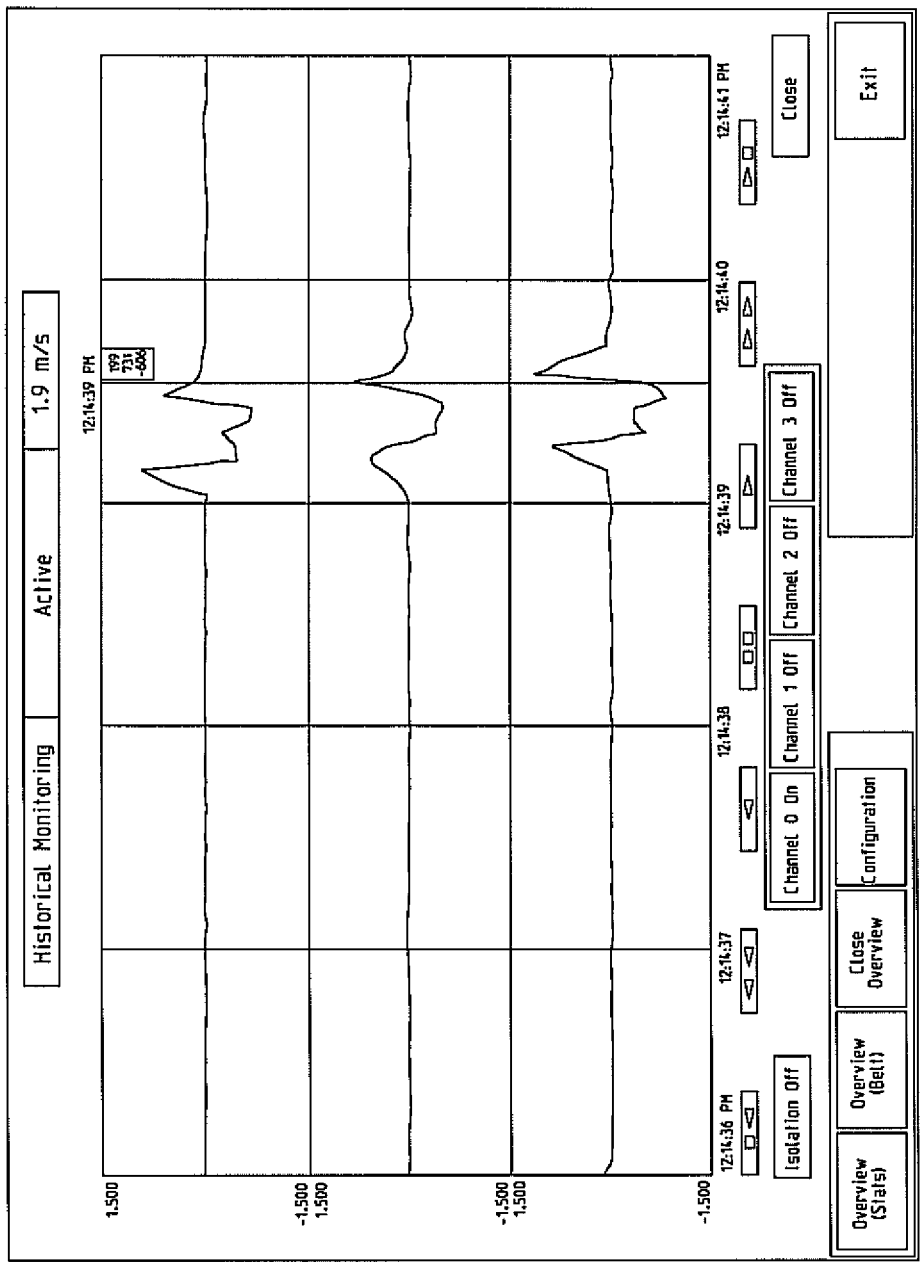
FIG. 9E shows a further refinement of the display of FIG. 9D in which each channel is represented separately.

FIG. 9D shows a full-screen representation of a splice joint event, with individual channels being displayed in different colors. As set forth above, the graphical representation of each of the channels displayed correspond to an endless longitudinal section of the conveyor belt. This full-screen display may be activated by simply double-clicking on the graphical display quadrant of the normal display. FIG. 9E is a further refinement of the display of FIG. 9D in which each channel is represented separately. As can be seen, soft keys at the bottom of the screen allow one or more channels to be switched off so that the user can highlight and focus on a particular channel of interest.

In addition to the benefits of the system described above, it is also highly compatible with existing mine monitoring systems because the inventive system is PLC-based, Applicants' new system, therefore, preserves the client's old system while also implementing the new features, (e.g., rip panels, monitoring features, control devices operating at the direction of the inventive system 1). For example, the PLC components used to construct the present system can be readily obtained from Rockwell International Corporation, and can thus be easily integrated into current mine systems using software sold under the trademarks RSVIEW or RSWORKS. The disclosed system display may be a page "dropped into" an existing conveyor belt and/or facility-wide industrial monitoring system.

In addition, if applicable, the disclosed system can immediately interact with the facility controller to instruct the mine system exactly where to stop the belt when repairs are required. Thus, belts and their metallic and non-metallic reinforcing components, rip panels, and splices may be analyzed and the corresponding belt systems controlled and managed irrespective of the particular manufacturer of these components and systems.

It will be understood that the description and drawings presented herein represent an embodiment of the invention, and are therefore merely representative of the subject matter that is broadly contemplated by the invention. It will be further understood that the scope of the present invention encompasses other embodiments that may become obvious to those skilled in the art, and that the scope of the invention is accordingly limited by nothing other than the appended claims.

What is claimed is:

1. An automated industrial monitoring system, comprising:
    a plurality of sensors for measuring a magnetic field in a conveyor belt component;
    a controller for receiving signals from said plurality of sensors, the controller in communication with a processor executing instructions for:
        populating a table with event data representative of the signals;
        comparing a first set of event data from the table with a second set of event data received from at least one of the plurality of sensors; and,
        triggering a user alarm if the second set of event data deviates from the first set of event data by a predetermined amount; wherein
    said system is effective for automatically recording and storing event data relating to said conveyor belt component, including the date and location on the belt corresponding to said event data when said system is operating in a learning mode or a monitoring mode, wherein new event data relating to the conveyor belt may be recorded and stored for comparison with subsequently obtained event data relating to the belt.

2. A system according to claim 1, wherein said system is effective for automatically transforming said event data into a graphical representation for display to a user.

3. A system according to claim 1, wherein said system is effective for automatically assigning the event data a rating corresponding to the magnitude of difference between a second waveform and a first waveform corresponding, respectively, to said second set of event data and said first set of event data.

4. A system according to claim 1, wherein said system further includes a graphical user interface connected to the controller so that a user may interact with and control said system.

5. A system according to claim 1, wherein said controller being a programmable logic controller (PLC) rack having modules so that said system may be selectively integrated into a larger facility-wide monitoring system.

6. A system according to claim 1, wherein said system further includes at least one camera for transmitting visual information regarding the conveyor belt to a display for viewing by a user.

7. A system according to claim 1, wherein said system further includes a conveyor belt control for receiving a signal from said controller and for directly or indirectly altering operation of the conveyor belt in response to that signal.

8. A system according to claim 1, wherein said plurality of sensors are effective for analyzing the conveyor belt by defining separate channels, each of said channels corresponding to an endless longitudinal section of said conveyor belt.

9. A system according to claim 8, wherein said system is effective for generating a graphical representation of each of the channels for simultaneous display to a user.

10. A system according to claim 1, wherein said conveyor belt component includes one or more members of the group consisting of: a steel cord, a splice and a rip panel.

11. A system according to claim 10, wherein said conveyor belt includes at least one radio frequency identification (RFID) chip, said chip providing information to said system relating to said at least one chip, a rip panel associated with said at least one chip, or a belt splice associated with said at least one RFID chip.

12. A system according to claim 11, wherein said system is operably connected to one or more members of the group consisting of: a facility-wide monitoring system, an Intranet, a virtual private network and the Internet.

13. A system according to claim 11, wherein said instructions further include instructions for calculating a slope measurement at a plurality of points along a first waveform and at a plurality of points along a second waveform.

14. A system according to claim 11, wherein said instructions further include instructions for recording first positive and first negative maximum amplitudes and second positive and second negative maximum amplitudes of each of said signals.

15. A system according to claim 11, wherein said plurality of sensors comprise coil sensors or Hall Effect sensors.

16. A system according to claim 11, wherein a radio frequency identification (RFID) chip is electrically connected to a conductive loop, said loop includes legs extending across the width of the conveyor belt, and the chip is effective for sending a current through said legs.

17. A method for controlling a conveyor belt condition monitoring system that produces signals from conveyor belt system sensors to provide automatic fault monitoring and signal analysis, said method comprising:
    providing a programmable logic controller (PLC) for receiving the signals, the PLC in communication with a processor executing instructions for:
        populating a table with event data representative of the signals;
        comparing a first set of event data from the table with a second set of event data received from at least one of the sensors;
        triggering an alarm if the second set of event data deviates from the first set of event data by a predetermined amount; and
        automatically recording and storing event data relating to a conveyor belt component, including the date and location on the belt corresponding to said event data when said system is operating in a learning mode or a monitoring mode so that new event data relating to said belt is recorded and stored for comparison with subsequently obtained event data relating to the conveyor belt.

18. A method according to claim 17, wherein said plurality of sensors comprise coil sensors or Hall Effect sensors.

19. A method according to claim 17, wherein said method further includes automatically transforming said event data into a corresponding graphical representation for display to a user.

20. A method according to claim 17, wherein said method further includes automatically assigning the event data a rating corresponding to the magnitude of difference between a second waveform and a first waveform.

21. A method according to claim 17, wherein said method further includes operably connecting a graphical user interface to the PLC so that a user may interact with and control said system.

22. A method according to claim 17, wherein said method further includes selectively integrating into a larger facility-wide monitoring system modules of a PLC rack so that said system is scalable.

23. A method according to claim 17, wherein said method further includes providing at least one camera operable to transmit visual information regarding the conveyor belt to a display for viewing by a user.

24. A method according to claim 17, wherein said method further includes providing a belt control for receiving a signal from said PLC and for directly or indirectly altering operation of the conveyor belt in response to that signal.

25. A method according to claim 17, wherein the method includes analyzing longitudinal sections across the width of the conveyor belt with said sensors by defining separate channels corresponding to the sections of the belt.

26. A method according to claim 25, wherein said method includes automatically generating a graphical representation of each of the channels for simultaneous display to a user.

27. A method according to claim 17, further comprising entering values into the controller that correspond to alarm and trip tolerances for events specific to a particular belt, wherein alarm and trip occurrences relating to said events may be stored, recorded, and displayed to a user.

28. A method according to claim 17, wherein said event data relating to the conveyor belt component comprises an event waveform, and said method includes automatically recording said event data in a belt data table/belt map in the processor.

29. A method according to claim 28, wherein said conveyor belt component includes one or more members of the group consisting of: a steel cord, a splice and a rip panel.

30. A method according to claim 28, wherein said method further includes operably connecting said system to one or more members of the group consisting of: a facility-wide monitoring system, an Intranet, a virtual private network and the Internet.

31. A method according to claim 28, wherein said method further includes calculating a slope measurement at a plurality of points along a first waveform and at a plurality of points along a second waveform to determine deviations in event data.

32. A method according to claim 28, wherein said method further includes recording first positive and first negative maximum amplitudes and second positive and second negative maximum amplitudes of each of said signals in order to determine deviations in event data.

33. A method according to claim 17, wherein said method further includes calculating a slope measurement at a plurality of points along a first waveform and at a plurality of points along a second waveform to determine deviations in event data.

34. A method according to claim 17, wherein said method further includes recording first positive and first negative maximum amplitudes and second positive and second negative maximum amplitudes of each of said signals in order to determine deviations in event data.

35. A method according to claim 17, wherein said method includes automatically performing input mapping, wherein sensor data paths are mapped to locations in the processor.

36. A method according to claim 35, wherein the method includes automatically dividing numbers representative of signals from the conveyor belt sensors by the velocity of the conveyor belt to normalize said signals such that the accuracy of the event data is not influenced by the velocity of the conveyor belt.

37. A method according to claim 35, wherein the method includes comparing said event data with previously stored data relating to particular conveyor belt components specific to a particular conveyor belt to positively identify said conveyor belt or any one of said conveyor belt components.

38. A method according to claim 35, further comprising entering values into the controller that correspond to alarm and trip tolerances for events specific to a particular belt, wherein alarm and trip occurrences relating to said events may be stored, recorded, and displayed to a user.

* * * * *